(12) United States Patent
Fritz et al.

(10) Patent No.: US 8,398,277 B2
(45) Date of Patent: Mar. 19, 2013

(54) VEHICLE LIGHTING SYSTEM

(76) Inventors: Billie Brandt Fritz, Davis, CA (US);
Toby John Lloyd, San Luis Obispo, CA (US)

(*) Notice: Subject to any disclaimer, the term of this patent is extended or adjusted under 35 U.S.C. 154(b) by 199 days.

(21) Appl. No.: 13/041,352

(22) Filed: Mar. 4, 2011

(65) Prior Publication Data

US 2011/0216548 A1    Sep. 8, 2011

Related U.S. Application Data

(60) Provisional application No. 61/311,146, filed on Mar. 5, 2010.

(51) Int. Cl.
*B60Q 1/00*    (2006.01)

(52) U.S. Cl. ........ 362/464; 362/465; 362/466; 362/507; 701/48

(58) Field of Classification Search ............... 362/464, 362/465, 466, 467, 468, 507; 701/48
See application file for complete search history.

(56) References Cited

U.S. PATENT DOCUMENTS

| | | | |
|---|---|---|---|
| 8,185,271 B2 * | 5/2012 | Tichy et al. | 701/45 |
| 2010/0168966 A1 * | 7/2010 | Tsujii et al. | 701/48 |

* cited by examiner

*Primary Examiner* — Ali Alavi
(74) *Attorney, Agent, or Firm* — Ken J. Koestner; Koestner Patent Law

(57) ABSTRACT

An illumination controller comprise at least one sensor configured to sense position and motion of an operator of a banking vehicle, an illumination adjustment actuator, and a controller configured to determine angular velocity and/or linear acceleration, and banking angle of the vehicle from the sensed position and motion signals. The controller controls the illumination adjustment actuator to direct the illumination in anticipation of and during a turn.

19 Claims, 10 Drawing Sheets

VEHICLE LIGHTING SYSTEM

BACKGROUND

When a motor vehicle approaches a turn and drives in preparation for and through a turn in a road at night, the vehicle's forward lighting, which remains in a fixed position on a standard vehicle, points over the outside edge of the corner directly in front of the vehicle and not toward the vehicle's forward path through the turn. The area toward which the vehicle is turning remains poorly illuminated so that road conditions and turn radius in that area are difficult to see.

SUMMARY

Embodiments of an illumination controller comprise at least one sensor configured to sense position and motion of an operator of a banking vehicle, an illumination adjustment actuator, and a controller configured to determine angular velocity and/or linear acceleration, and banking angle of the vehicle from the sensed position and motion signals. The controller controls the illumination adjustment actuator to direct the illumination in anticipation of and during a turn.

In accordance with embodiments of a technique for vehicle illumination control, a method for directing terrain illumination of a vehicle can comprise detecting operator position relative to the vehicle, detecting dynamic properties of the vehicle, and determining from the detected operator position and the detected dynamic properties where to direct vehicle illumination in anticipation of and during a turn. The illumination is directed according to the determination.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
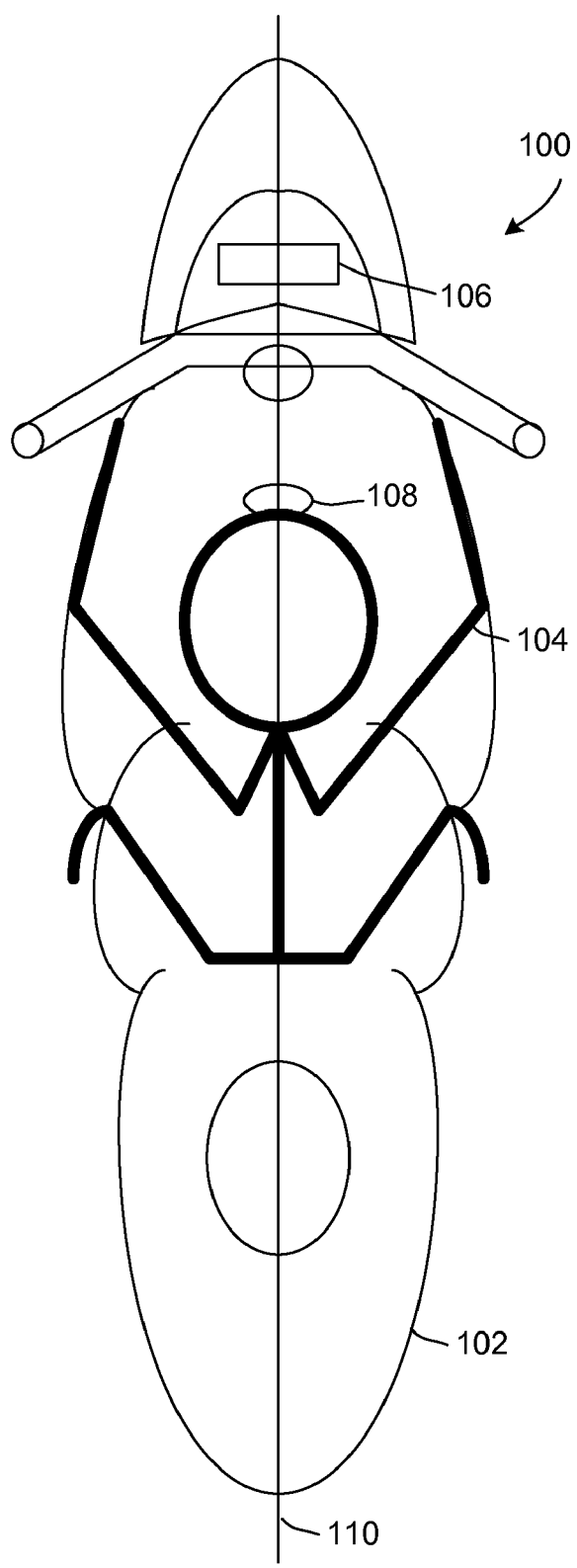
FIGS. 1A and 1B are top views showing an example embodiment of a banking vehicle, specifically a motorcycle, and operator seated on the motorcycle in, respectively, (A) a vertical (not cornering) position, facing straight ahead, and (B) showing how relative movement of the operator can be used to determine the direction of the upcoming turn.

A system and method are disclosed that move one or more headlight units on a vehicle to increase illumination in the direction of the vehicle's forward path. The system and method are particularly adapted for illuminating the terrain in preparation for and during a turn.

The term "turn" includes any curved section of terrain, road, highway, path, or any corner such as occurs at an intersection or the entry to a driveway and the like.

Embodiments of a lighting system are capable of controlling the light distribution of forward lighting on a motor vehicle to optimize illumination along the vehicle's forward path as the vehicle approaches, proceeds through, and exits a turn in the road in low-light conditions. The lighting system can comprise a control system, sensors, an electromechanical mount(s), a moveable light(s), and a marker. The control system can control the movement of a headlight unit(s) in two or three dimensions. An electromechanical mount can be included which is responsive to outputs from the control system and moves a moveable light or lights. Movement of the moveable light(s) can correspond to one or both positions of the operator relative to the operated vehicle (relative operator position) and/or vehicle dynamics. Relative operator position and vehicle dynamics are measured using sensors which provide signals used as system input signals to the control system. A marker can be placed in a forward, central position near or on the upper body or head of the rider and is detected by sensors. Measuring the relative operator position enables the control system to anticipate upcoming turns and move or direct the moveable lights in a corresponding direction before and/or during entry to a turn, during a turn, and during or after exiting a turn. Measuring vehicle dynamics enables the control system to determine the lean angle of a vehicle during a turn and move the movable lights in a corresponding direction. The system can be used on vehicles that lean significantly while cornering, for example, a motorcycle, and can also be implemented on other vehicles.

A suitable moveable light or lights for use in the illumination control system can include one or more aftermarket light(s), original equipment lights, or a combination thereof.

A system can be created for moving a lighting system on a vehicle with particular utility for a banking vehicle such as a motorcycle.

In an illustrative embodiment, a system facilitates adjustment and movement of a light, lamp, headlight, or headlamp of a vehicle such as a motorcycle or other banking vehicle. The illumination system can include a light distribution adjusting mechanism (illumination adjustment actuator) for changing the range of illumination in preparation for and during cornering of the vehicle, for example a motorcycle, enabling controlled movement of a light emitting element about a longitudinal axis running from fore to aft of the vehicle and also enabling controlled movement about an axis perpendicular to the road surface. The system can further include a position detector for determining the direction and magnitude the rider is looking from the center vertical plane of the motorcycle running from fore to aft. An example position detector can include an optical sensor for monitoring the rider's head movement and a marker used to form a high contrast means for recognition. A bank angle detector can be included for detecting the amount of bank angle lean of the motorcycle. An example embodiment of the bank angle detector can include a gyroscope for measuring the angular velocity of the motorcycle, and a linear accelerometer for measuring linear accelerations of the motorcycle. A bank angle calculator can be included in the system for calculating the bank angle lean of the motorcycle using the angular velocity and/or linear accelerations of the motorcycle. Position detectors can be included for closed loop control of the light distribution adjusting mechanism about both the longitudinal axis running from fore to aft and the vertical axis perpendicular to the road surface.

In some embodiments, the optical sensor can be configured to operate in the non-visible light spectrum as to not distract or blind the rider.

In some embodiments, one or more linear accelerometers can be used to alter the magnitude of the movement of the headlight or headlamp.

In some embodiments, linear accelerometers can be used to reset the bank angle calculator.

In an example embodiment, the system can further include an electro-mechanical actuator configured for moving of a light distribution adjusting mechanism (the illumination adjustment actuator) about the longitudinal axis of the motorcycle running from fore to aft. The system can also include an electro-mechanical actuator configured for moving the light distribution adjusting mechanism (illumination adjustment actuator) about an axis perpendicular to the road surface. The system can be controlled so that the degree to which the headlight or headlamp is moved about an axis perpendicular to the road surface at any given bank angle is determined by the magnitude and direction that marker is displaced from the center vertical plane of the motorcycle running from fore to aft.

For a system that includes a electro-mechanical actuator configured for moving of a light distribution adjusting mechanism (the illumination adjustment actuator) about the longitudinal axis of the motorcycle running from fore to aft, the degree of movement about the longitudinal axis running from fore to aft of the motorcycle can be held equal to and in opposite direction of the bank angle of the motorcycle order to maintain the horizontal illumination distribution parallel to the horizon at all times.

An example embodiment of the system can include one or more potentiometers configured to determine the position of the illumination adjustment actuator which is operative for adjusting the light distribution.

The system can further comprise a light distribution adjustment actuator including a light emitting element and reflector that is continuously maintained in an orientation with a horizontal plane always parallel with the horizon and moved about an axis perpendicular to the road surface.

An embodiment of a sample system and comprise an input sensor configured to detect operator position relative to the vehicle and/or dynamic properties of the vehicle and a control system that responds to signals from the sensor. The control system can include a processor and processor-executable instructions operative to interpret signals from input sensor and generate appropriate, corresponding output signals to one or more motorized drivers. The motorized drivers are coupled to a mount. The processor operates to control the motorized drivers.

Another example embodiment of the illumination system can comprise a mount that couples a lighting system, for example a headlamp or headlight, onto a mounting location on the vehicle. The mount can enable the lighting system to be moved in up to three dimensions.

In accordance with method embodiments for moving a lighting system on a vehicle, a method can comprise detecting operator position relative to the vehicle and dynamic properties of the vehicle. The method can further comprise determining from the detected properties where the lighting system must be moved to before and during a turn, and moving the lighting system accordingly.

Figure 1B:
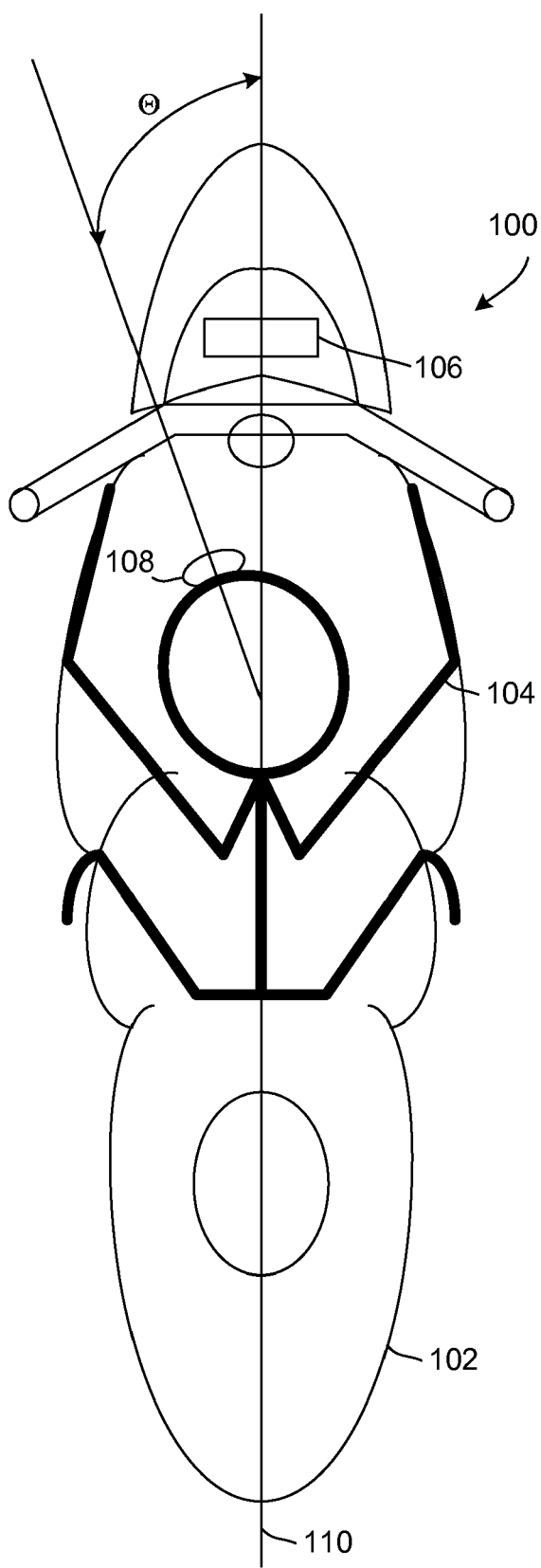
Figure 8:
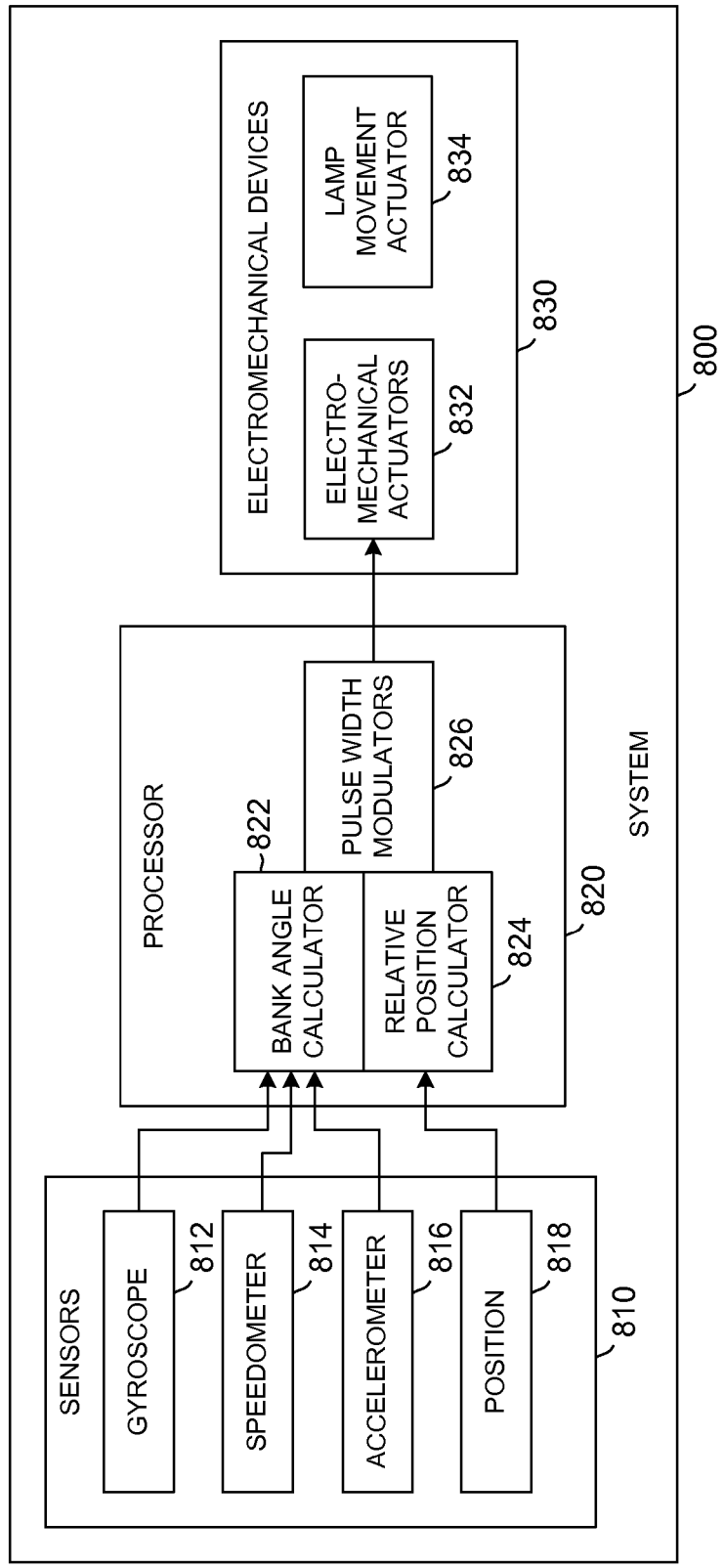
FIG. 8 is a simplified block diagram illustrating system relationships in an embodiment of an illumination control system for moving a lighting system on a vehicle.

Referring to FIGS. 1A, 1B, and 8 in combination, embodiments of an illumination controller 100, 800 can comprise at least one sensor 810 configured to sense position and motion of an operator 104 of a banking vehicle 102, an illumination adjustment actuator 832, and a controller 820 configured to determine angular velocity and/or linear acceleration, and banking angle of the vehicle from the sensed position and motion signals. The controller 820 controls the illumination adjustment actuator 832 to direct the illumination in anticipation of and during a turn.

In some embodiments, the illumination controller 100, 800 can further comprise a bank angle detector (part of sensors 810) configured for detecting bank angle magnitude of the banking vehicle 102. The bank angle detector can comprise a gyroscope 812 configured for measuring the angular velocity of the banking vehicle 102 and a linear accelerometer 816 configured for measuring linear accelerations of the banking vehicle 102. The illumination controller 100, 800 can further comprise a bank angle calculator 822 configured for calculating bank angle magnitude of the banking vehicle 102 from measured angular velocity and/or linear acceleration of the banking vehicle 102. The illumination controller 100, 800 can also comprise one or more speedometers 814 and/or linear accelerometers 816 configured to reset the bank angle calculator 822.

In some embodiments, the illumination controller 100, 800 can further comprise an electro-mechanical actuator or mount 830 configured for movement of the illumination adjustment actuator 832 about a longitudinal axis 110 of the banking vehicle 102 running from fore to aft, and a light movement mechanism 834.

The electro-mechanical actuator 830 can be configured for movement of the illumination adjustment actuator 832 about an axis perpendicular to the road surface.

The illumination controller 100, 800 can further comprise one or more linear accelerometers 816 configured to modify magnitude of movement of the illumination adjustment actuator 832 about the axis perpendicular to the road surface.

The amount and character of movement of the illumination adjustment actuator 832 about the axis perpendicular to the road surface at a particular bank angle can be determined by magnitude and direction of displacement of a marker 108 from a center vertical plane 100 of the vehicle 102 running from forward to aft.

In some embodiments, the electro-mechanical actuator 830 can be configured for movement of the illumination adjustment actuator 832 about a longitudinal axis 110 of the banking vehicle 102 running from fore to aft wherein amount and character of movement of the illumination adjustment actuator 832 about the longitudinal axis 110 running fore and aft of the vehicle 102 is equal to and in opposite direction the vehicle banking angle wherein a horizontal illumination distribution parallel to earth horizontal is continuously maintained.

Sensors 810 for the illumination control system 100, 800 can further comprise one or more potentiometers 818 configured to determine position of the illumination adjustment actuator 832.

A sensor 810 can be any suitable device used to produce an electronic output signal proportional to the strength or other characteristic (i.e. frequency) of an imposed detectable condition. A sensor 810 can detect one or more detectable conditions. The lighting system uses infrared or another type of optical sensor(s) 700 (FIG. 7) and a dynamic sensor(s) 810, or any other possible combination of sensor options, as input sensors to the control system. One or more optical sensors 700 can be used to measure a current position of the operator's head and/or upper torso relative to the vehicle 102 and may be referred to as relative position sensor 818 as described herein. An optical sensor 700 is capable of detecting light in the infrared light spectrum and/or other light spectrums as well. One or more relative position sensors 818 can be mounted to the vehicle 102, for example in front of the operator 104 in a fixed orientation such that the operator 104, when sitting centered on the vehicle seat, is in the center of the field of vision of the relative position sensor 818. The dynamic sensors 910 can include one or more gyroscopes 812 for measuring angular velocity of the vehicle 102 and one or more linear accelerometers 816 for measuring linear velocity of the vehicle 102. The control system processes the output signals from the sensors 810 to determine which direction (angle Θ) the operator 104 is facing or looking. The control system moves the lights to increase illumination in the direction the operator 104 is facing or looking. For vehicles 102 that lean significantly while cornering, one or more additional sensors can measure the rate of angular or lateral acceleration, speed, and/or lean angle of the vehicle 102. The control system receives and processes the output signals from the sensors to determine how far and in what direction the lights should be moved to maintain adequate forward illumination.

The control system 820 can be an electronic control module that includes a central processing unit/microcontroller (CPU) that can execute instructions and logic sufficient to control an electromechanical mount or mounts 830 through control system output signals based on control system input signals from various sensors 810.

Control system input signals can be sensor output signals received by the control system input connections. The processor 820, for example central processing unit (CPU), executes logical expressions written in CPU executable code operative to compare the input signals against values determined by parameters set in the mentioned code. Results of execution of the logical expressions determine which coded instructions are carried out to send appropriate signals to an electromechanical mount(s) to control the light movement and increase illumination in the direction of the vehicle's forward path. The control system is capable of connecting to and controlling motorized drivers such as servos to move the electromechanical mount(s). In an example embodiment, the processor 820 can include encoded logical expressions implementing a bank angle calculator 822, a relative position calculator 824, pulse width modulators 826, and other functional blocks.

Figure 2:
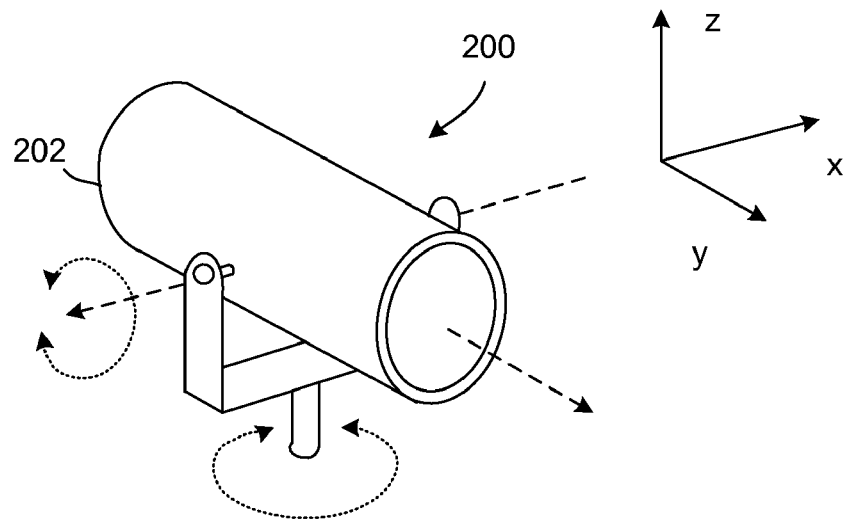
FIG. 2 is a schematic pictorial perspective view illustrating an example of a simplified mounting apparatus for the lighting system embodiment which enables three dimensional movement of a light unit.

FIG. 2 illustrates a simplified light mounting apparatus 200 for the lighting system embodiment which enables three dimensional movement of a light unit. The illustrative light mounting apparatus 200 is arranged in an xyz-coordinate system that is fixed to the vehicle (motorcycle for example) with the y-axis extending from front to rear of the vehicle and the z-axis extending vertically from bottom to top of the vehicle. The light unit 202 faces in the forward direction of the motorcycle. The light unit 202 is shown adapted for rotation about two axes. Controlled rotation about the x-axis is used for upward deflection. Controlled rotation about the z-axis enables side-to-side deflection.

Figure 3:
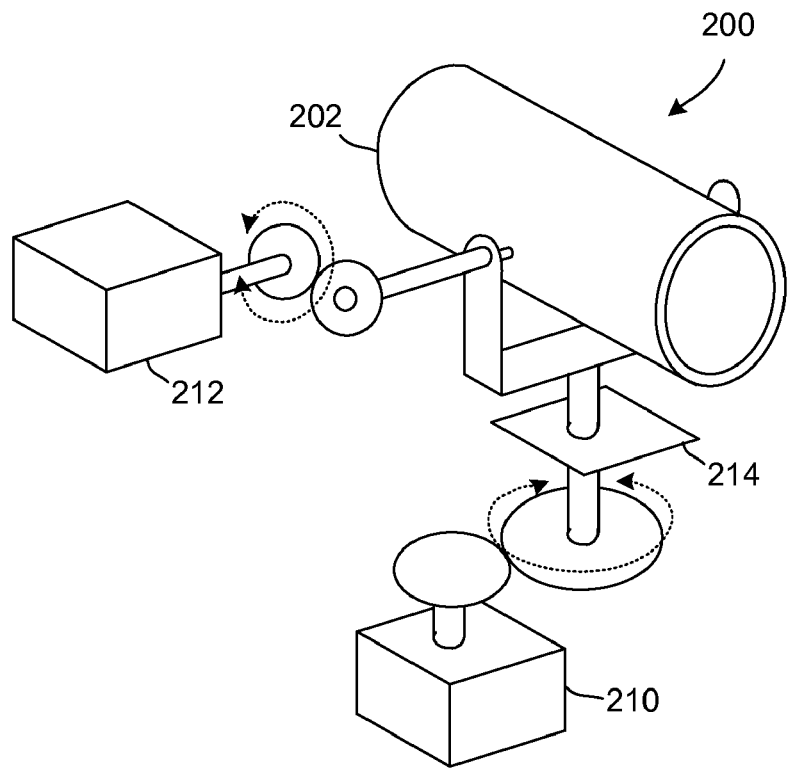
FIG. 3 is a schematic pictorial perspective view depicting an example of an electromechanical position control system of a light unit using servo motors meshed with gears to control light movement.

FIG. 3 shows the simplified light mounting apparatus 200 with motors 210, 212 and gears to dynamically rotate the light unit 202 about one or more axes. Driving motors 210 and 212 apply rotations respectively about the z-axis and the y-axis. Meshed gears can be used to transfer torque from the motors to the light unit 202.

Referring to FIGS. 2 and 3 in combination FIGS. 1A, 1B, and 8 in combination, embodiments of an illumination controller 100, 800 can comprise an input sensor 810 configured to detect operator position relative to the vehicle 102 and/or dynamic properties of the vehicle 102; and a control system coupled to the sensor 810. The control system can comprise a processor 820 and processor executable instructions operable to interpret signals from input sensor 810 and respond with a corresponding output signal and at least one motorized driver 210, 212 configured to receive the output signal and operate under control of the processor 820.

The illumination controller 100, 800 can further comprise a lighting system 200 and a mount 214 coupling the lighting system 200 to a mounting location on the vehicle 102. The mount 214 can be configured to enable movement of the lighting system 200 in up to three dimensions. The mount 214 can be coupled to the one or more motorized drivers 210, 212.

A mount 214 enabling three-dimensional movement of the lighting system 200 can be used to position the lighting system 200 on the vehicle 102. Movement of headlight unit(s) 202 can be achieved via motorized drivers 212, 214 such as servos. The drivers 212, 214 can be connected to the light(s) 202 through the usage of gears, pulleys, wires, or other suitable linkage and are controlled by the output signals from the control system.

Figure 4:
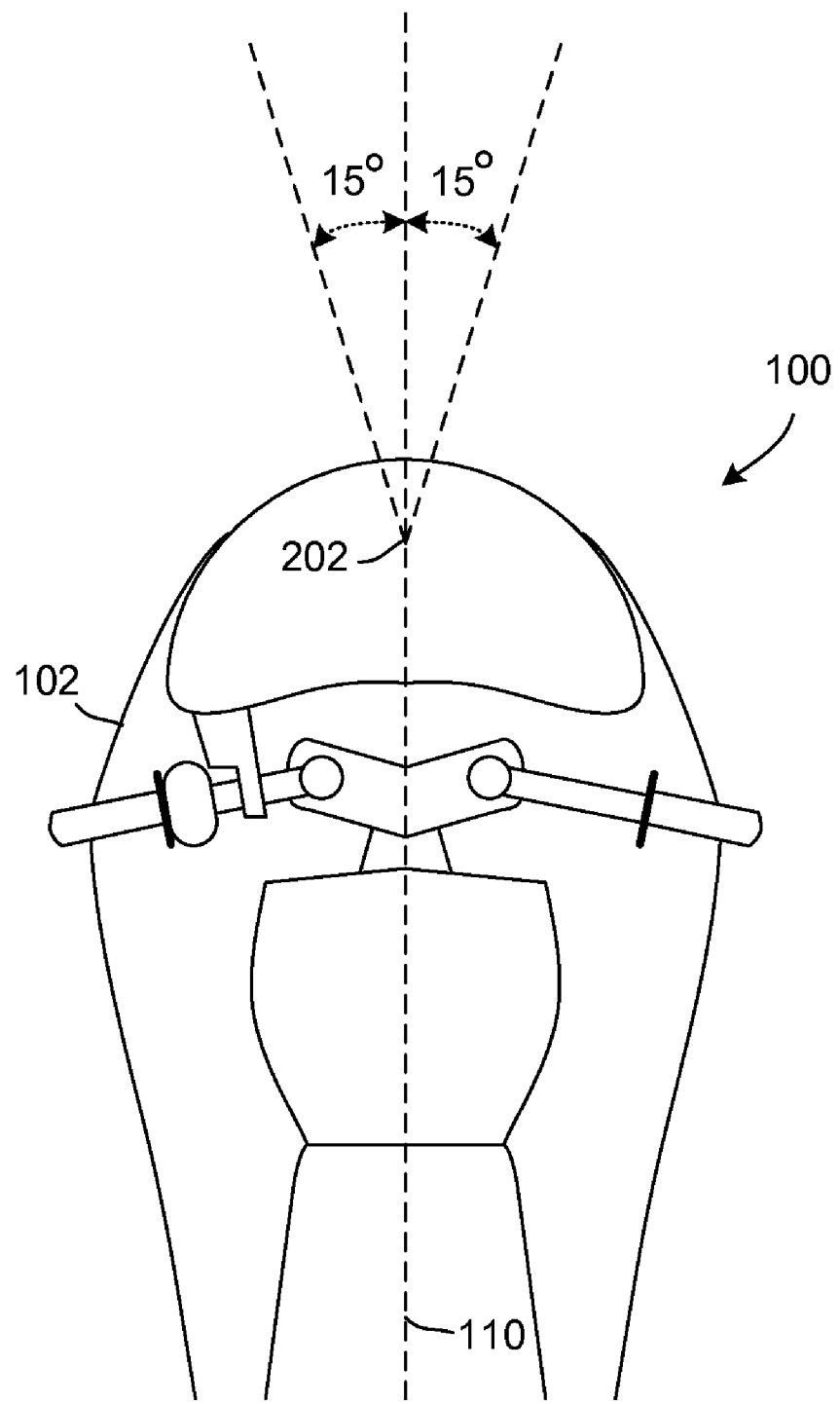
FIG. 4 is a top view of an example embodiment of a motorcycle including the illumination control system showing possible left to right range of light movement with respect to the motorcycle.
Figure 5:
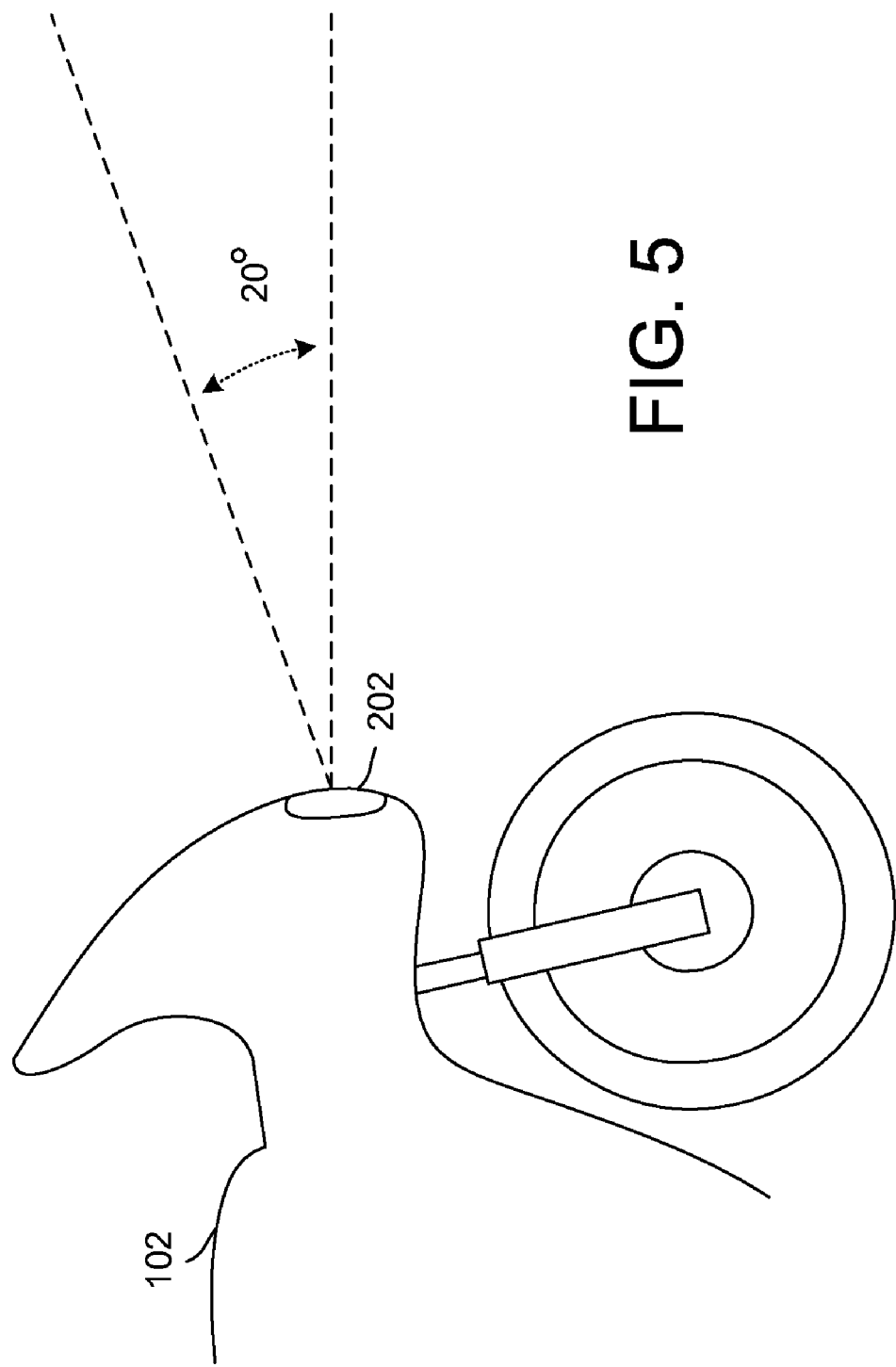
FIG. 5 is a schematic pictorial perspective side view of an example embodiment of a motorcycle with illumination control system illustrating possible upward movement of the light to correct aim direction while cornering.
Figure 6:
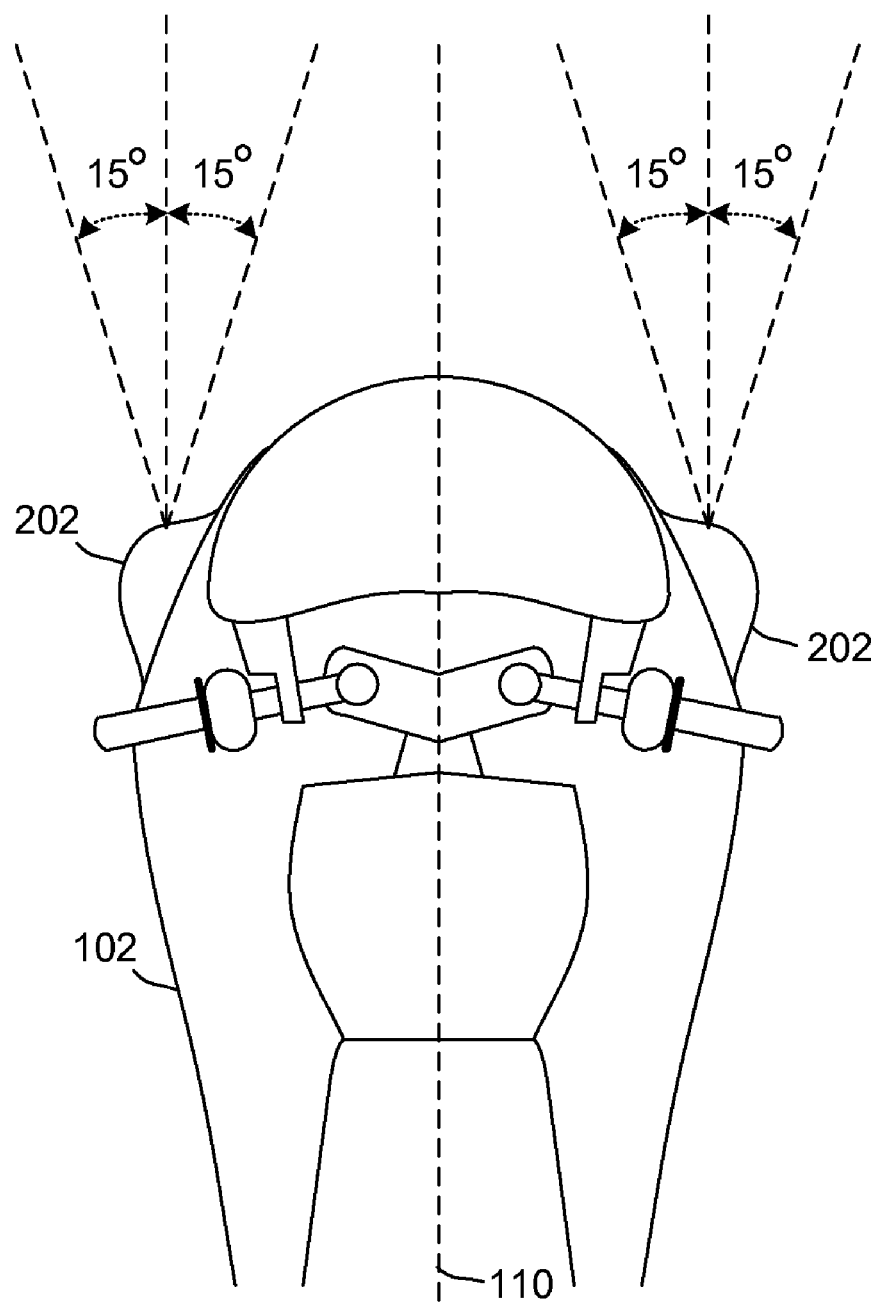
FIG. 6 is a top view of an example embodiment of a motorcycle including the illumination control system depicting an alternative configuration of the lighting system and the range of light movement.

Referring to FIGS. 4, 5, and/or 6, in combination with FIG. 8, the controller 820 is configured to adjust a range of illumination in preparation for, and during, cornering of the banking vehicle 102 and to control movement of a light emitting element 200 about a longitudinal axis 110 running from fore to aft of the vehicle 102 and about an axis perpendicular to a terrain surface.

Figure 7:
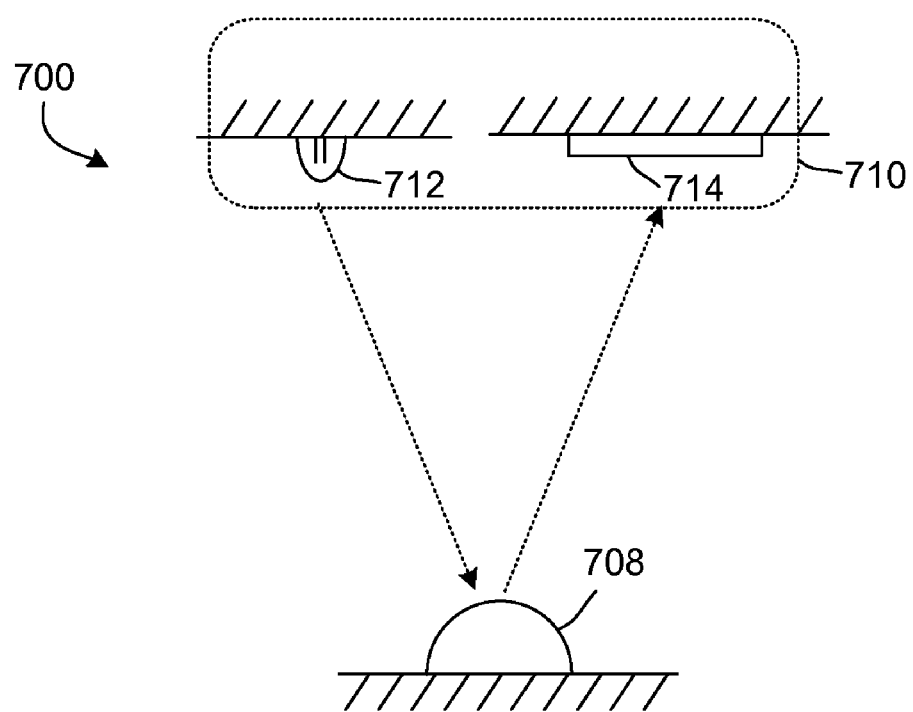
FIG. 7 is a schematic pictorial perspective view showing a marker for usage in an embodiment of an illumination control system that can be located and attached to the operator and can be used to send a signal back to a sensor for determining the relative position of the operator.

FIG. 7 shows a marker 708 for usage in an illumination control system that can be located and attached to an operator and can be used to send a signal back to a sensor 710 for determining the relative position of the operator. In an illustrative example, a positioning system 700 can include a sensor 710 affixed to the vehicle and the marker 708 for attachment to the operator or rider. Other embodiments may be connected in other arrangements. An example sensor 710 can include a light source 712, such as an infrared light source, and a CMOS or CCD sensing unit 714. In the example, the marker 708 can be a spherical reflector that always reflects to the sensing unit 710.

Referring to FIGS. 1A, 1B, and 7 in combination, illumination controller 100 can further comprise a position detector 106 configured to determine the direction and magnitude the operator 104 is facing from a center vertical plane 110 of the vehicle 102 running from fore to aft. The position detector 106 can comprise an optical sensor 710 (light source 712 and CMOS or CCD sensing unit 714) configured to monitoring operator head movement; and a marker 108 comprising a high contrast display (spherical reflector for example) 708 configured for recognition by the optical sensor 710.

The optical sensor 710 can operate in a light spectral range that is non-visible to the operator 104.

The one or more position detectors 106 can be configured to produce signals relating to both a longitudinal axis 110 running from fore to aft of the banking vehicle 102 and a vertical axis perpendicular to a terrain surface for use in closed loop control of the illumination adjustment actuator 832.

The illumination controller 100 can further comprise a light distribution adjustment actuator 700 comprising a light emitting element 712 and reflector 708 continuously maintained in an orientation with a horizontal plane held parallel with horizontal and moved about an axis perpendicular to the terrain surface.

A marker 108 can be a device or material that forms an area of high contrast to facilitate control system recognition of an optically targeted object by reflecting light in the infrared spectrum and/or other light spectrums as well. One or more markers 108 can be placed on the operator 104 or operator's accessories. Accessories can include, but are not limited to, apparel, eyewear, safety equipment, head gear, helmet, jacket, sunglasses, or other types of accessories and combinations thereof. A marker 108 can be placed in a forward, central position on the upper body or head of the rider and can be detected by optical sensors which vary their output as the position of the marker changes. The control system interprets the output signals from the optical sensors to determine the position of the marker 108, and thus the operator 104, relative to the vehicle 102.

The one or more markers 108 and one or more sensors 810 enable the operator's movement to be tracked by the control system.

Figure 9:
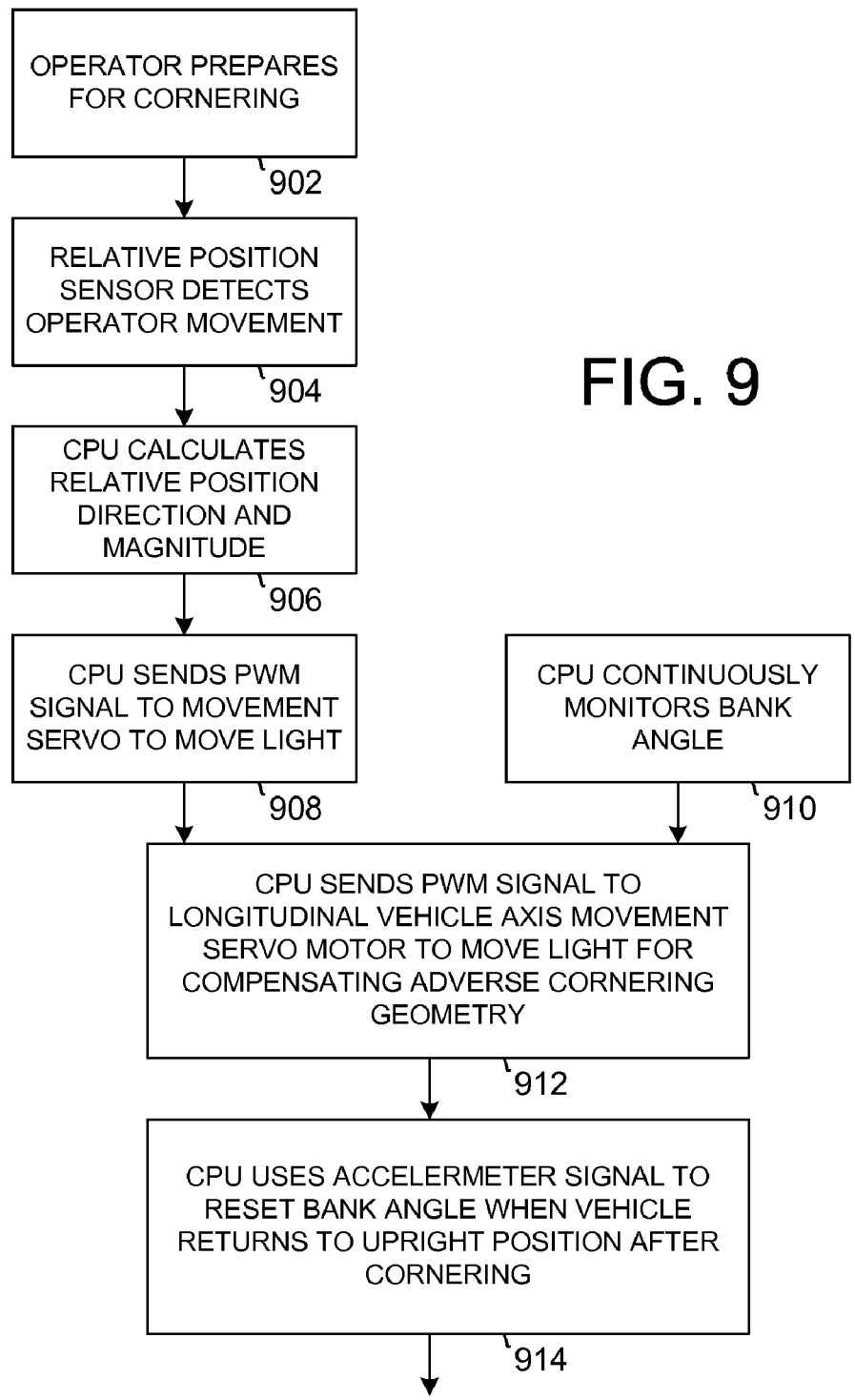
FIG. 9 is a flow chart depicting an embodiment of methods and operations for moving a lighting system on a vehicle.

Referring to FIG. 9, an embodiment of a method 900 for directing terrain illumination of a vehicle can comprise detecting 902, 904 operator position relative to the vehicle, detecting 906 dynamic properties of the vehicle, and determining 908 from the detected operator position and the detected dynamic properties where to direct vehicle illumination in anticipation of and during a turn. The illumination is directed 912 according to the determination.

In operation of a more specific embodiment of an illumination control method 900, the operator can turn and look ahead 902 in preparation for cornering. A relative position sensor can detect 904 the operator movement. A CPU calculates 906 relative position direction and magnitude from sensor input signals. The CPU can send 908 pulse width modulated signals to a left/right movement servo motor to move the movable light in a corresponding direction with proportional magnitude. The CPU can also mathematically integrate 910 a gyroscope signal to continuously monitor bank angle. The CPU can send 912 the pulse width modulated signal to a longitudinal vehicle axis movement servo motor to move light to compensate for adverse cornering geometry. The CPU can use accelerometer input signals to reset 914 bank angle when the vehicle returns to an upright position after cornering.

Figure 10A:
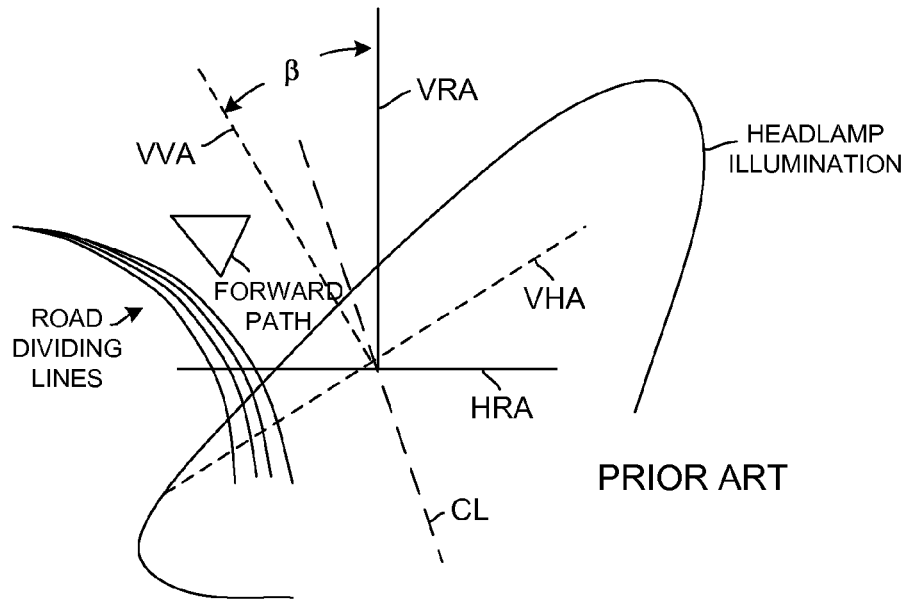
FIG. 10A is a simplified graph showing a lighting pattern of a leaning vehicle equipped with conventional stock low-beam headlamps.

When riding a vehicle such as a motorcycle, which leans while turning, on a curved section of roadway, an operator leans the vehicle in the direction of the turn at a bank angle ($\beta$) corresponding to the forward velocity of the vehicle and the radius of the curved section of road, enabling the vehicle to follow a curved path through the section of roadway ahead. The action of leaning the vehicle into a curve to follow a desired forward path is called cornering and will be referred to accordingly for the remainder of this description. A typical low-beam headlamp illumination pattern while cornering at night is illustrated in FIG. 10A, labeled PRIOR ART. The inscribed headlamp illumination pattern (internal area) in FIG. 10A shows the absence or lack of illumination in the forward path (area within forward path triangle) of the operator. As an operator is cornering, the vehicle vertical axis (line VVA) is leaned at a bank angle ($\beta$) from the vertical reference axis (line VRA, normal to the road surface). While the vehicle is leaned at the bank angle ($\beta$), the horizontal light distribution projecting forward from the headlamp and aligned with the longitudinal centerline of the vehicle (line CL) and spreading along the vehicle horizontal axis (line VHA), in combination with the downward illumination characteristics of low-beam headlamps, causes the emitted light to intersect the roadway closer to the vehicle on the inside of the turn thus reducing the amount of forward illumination of the forward path area depicted by the triangle. Note that in the conventional system the illuminated area does not coincide with the forward path of the vehicle during a turn, a highly unsafe and disadvantageous condition since the operator has difficulty seeing road conditions in the forward path to prepare for maneuvering.

Figure 10B:
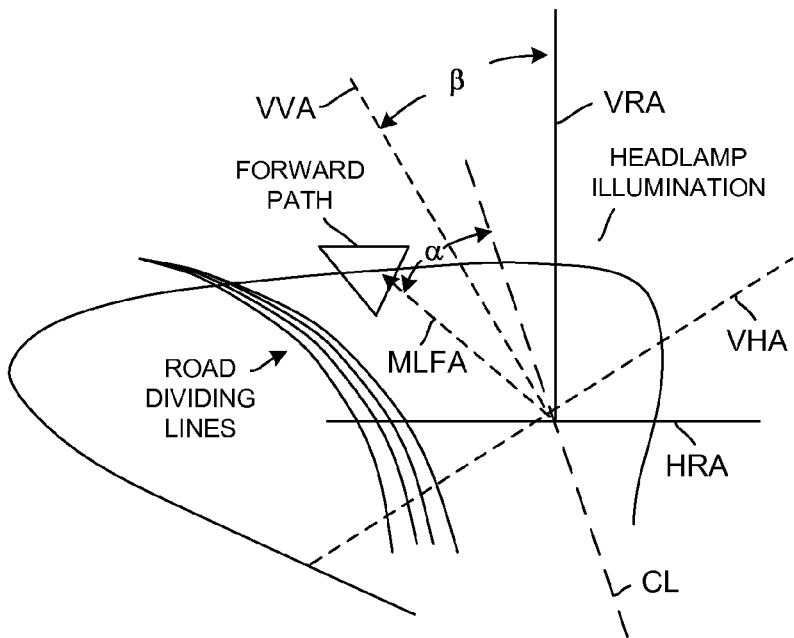
FIG. 10B is a simplified graph illustrating a corrected lighting pattern achieved by the lighting system according to embodiments of the illustrative systems and methods.

Referring to FIG. 10B, in the operation illumination control system and associated method disclosed herein, the movement of the movable light about the longitudinal centerline of the vehicle (line CL) and movable light vertical axis (line MLVA) illuminate the forward path (triangular area) with the corrected forward lighting pattern (enclosed area) coinciding with and encompassing the forward path area.

As the operator approaches a curved section of roadway while still in the upright position, prior to cornering, the vehicle vertical axis (line VVA) is aligned with the vertical reference axis (line VRA). The movable light is moved about the movable light vertical axis (line MLVA), which prior to cornering is aligned with both the vehicle vertical axis (line WA) and the vertical reference axis (line VRA) to deflect the movable light forward axis (line MLFA) a horizontal deflection angle ($\alpha$) to be better oriented towards the forward path area thus supplying better illumination of the curved roadway ahead and, in addition, functioning in anticipation of corners and curved sections of road illustrated in FIG. 10B. The magnitude of the horizontal deflection angle ($\alpha$) is controlled by the control system and calculated based primarily, but not exclusively, on the relative position sensor output signal to the control system. The relative position sensor 700 and 818 depicted respectively in FIGS. 7 and 8 can be a stationary optical sensor affixed to the vehicle in a location permitting unobstructed view of the operator. The position sensor generates an array of image data to the coupled CPU 820. The output image data is then processed by the CPU 820 to calculate the relative position of the operator. As the operator moves in the direction of the upcoming turn, the position sensor generates an array of image data that contains the position of the marker on the operator relative to the vehicle. From the relative position calculation, the CPU 820 outputs a signal to a servo in the electromechanical mount moving the movable light about the movable light vertical axis (line MLVA) in the same direction of the relative position and with similar magnitude.

To maintain optimal horizontal light distribution on the roadway in the forward path of the vehicle, the movable light can be moved about the longitudinal centerline of the vehicle (line CL) with equal magnitude but opposite in direction of the bank angle ($\beta$), thus maintaining that the movable light vertical axis (line MLVA) be aligned with the vertical reference axis (line VRA) instead of aligned with the vehicle vertical axis (line WA) as illustrated in FIG. 10B. With the previously disclosed alignment of the movable light vertical axis, the horizontal light distribution can be maintained parallel with the horizon and therefore provide the maximum amount of light distribution on the road. In operation, as the operator begins to lean the vehicle clockwise into the upcoming turn an angular rate sensor, coupled to the CPU as a system input for the control system, generates an electronic signal proportional to the angular rate of movement about the longitudinal centerline of the vehicle. The angular rate sensor electronic signal output is then mathematically integrated by the CPU thus calculating the bank angle ($\beta$) of the vehicle. The bank angle ($\beta$) is then used by the CPU to send a proportional signal to a servo in the electromechanical mount thus moving the movable light about the longitudinal centerline of the vehicle in a counter-clockwise direction with similar magnitude opposite the bank angle direction, thus moving the horizontal light distribution to be parallel with the horizon.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. An illumination controller comprising:
   at least one sensor configured to sense position and motion of an operator of a banking vehicle;
   an illumination adjustment actuator; and
   a controller configured to determine angular velocity and/or linear acceleration, and banking angle of the vehicle from the sensed position and motion signals, the controller adapted to control the illumination adjustment actuator to direct the illumination in anticipation of and during a turn.

2. The illumination controller according to claim 1 wherein:
   the controller is configured to adjust a range of illumination in preparation for, and during, cornering of the banking vehicle and to control movement of a light emitting element about a longitudinal axis running from fore to aft of the vehicle and about an axis perpendicular to a terrain surface.

3. The illumination controller according to claim 1 further comprising:
   a position detector configured to determine direction and magnitude the operator is facing from a center vertical plane of the vehicle running from fore to aft, the position detector comprising:
   an optical sensor configured to monitoring operator head movement; and
   a marker comprising a high contrast display configured for recognition by the optical sensor.

4. The illumination controller according to claim 3 wherein:
   the optical sensor operates in a light spectral range that is non-visible to the operator.

5. The illumination controller according to claim 1 further comprising:
   a bank angle detector configured for detecting bank angle magnitude of the banking vehicle, comprising:
   a gyroscope configured for measuring the angular velocity of the banking vehicle; and
   a linear accelerometer configured for measuring linear accelerations of the banking vehicle.

6. The illumination controller according to claim 1 further comprising:
   a bank angle calculator configured for calculating bank angle magnitude of the banking vehicle from measured angular velocity and/or linear acceleration of the banking vehicle.

7. The illumination controller according to claim 6 further comprising:
   at least one linear accelerometer configured to reset the bank angle calculator.

8. The illumination controller according to claim 1 further comprising:
   at least one position detector configured to produce signals relating to both a longitudinal axis running from fore to aft of the banking vehicle and a vertical axis perpendicular to a terrain surface for use in closed loop control of the illumination adjustment actuator.

9. The illumination controller according to claim 1 further comprising:
   a light distribution adjustment actuator comprising a light emitting element and reflector continuously maintained in an orientation with a horizontal plane held parallel with horizontal and moved about an axis perpendicular to a terrain surface.

10. The illumination controller according to claim 1 further comprising:
    an electro-mechanical actuator configured for movement of the illumination adjustment actuator about a longitudinal axis of the banking vehicle running from fore to aft.

11. The illumination controller according to claim 1 further comprising:
    an electro-mechanical actuator configured for movement of the illumination adjustment actuator about an axis perpendicular to the road surface.

12. The illumination controller according to claim 11 further comprising:
    at least one linear accelerometer configured to modify magnitude of movement of the illumination adjustment actuator about the axis perpendicular to the road surface.

13. The illumination controller according to claim 11 wherein:
   amount and character of movement of the illumination adjustment actuator about the axis perpendicular to the road surface at a particular bank angle is determined by magnitude and direction of displacement of a marker from a center vertical plane of the vehicle running from forward to aft.

14. The illumination controller according to claim 1 further comprising:
   an electro-mechanical actuator configured for movement of the illumination adjustment actuator about a longitudinal axis of the banking vehicle running from fore to aft wherein amount and character of movement of the illumination adjustment actuator about the longitudinal axis running fore and aft of the vehicle is equal to and in opposite direction the vehicle banking angle wherein a horizontal illumination distribution parallel to earth horizontal is continuously maintained.

15. The illumination controller according to claim 1 further comprising:
   at least one potentiometer configured to determine position of the illumination adjustment actuator.

16. The illumination controller according to claim 1 further comprising:
   an input sensor configured to detect operator position relative to the vehicle and/or dynamic properties of the vehicle; and
   a control system coupled to the sensor comprising:
      a processor and processor executable instructions operable to interpret signals from input sensor and respond with a corresponding output signal;
      at least one motorized driver configured to receive the output signal and operate under control of the processor; and
      a mount coupled to the at least one motorized driver.

17. The illumination controller according to claim 1 further comprising:
   a lighting system; and
   a mount coupling the lighting system to a mounting location on the vehicle, the mount configured to enable movement of the lighting system in up to three dimensions.

18. A method for directing terrain illumination of a vehicle comprising:
   detecting operator position relative to the vehicle;
   detecting dynamic properties of the vehicle;
   determining from the detected operator position and the detected dynamic properties where to direct vehicle illumination in anticipation of and during a turn; and
   directing the illumination according to the determination.

19. A vehicle illumination control apparatus comprising:
   means for directing terrain illumination of a vehicle;
   means for detecting operator position relative to the vehicle;
   means for detecting dynamic properties of the vehicle;
   means for determining from the detected operator position and the detected dynamic properties where to direct vehicle illumination in anticipation of and during a turn; and
   means for directing the illumination according to the determination.

* * * * *